(No Model.) 9 Sheets—Sheet 1.
C. F. BROWN.
CASH REGISTER, INDICATOR, AND RECORDER.

No. 474,791. Patented May 10, 1892.

Witness
J. M. Fowler Jr.
Arthur E. Dowell

Inventor
Chas. F. Brown
by
J. M. Alexander
Attorney (No Model.) 9 Sheets—Sheet 2.

C. F. BROWN.
CASH REGISTER, INDICATOR, AND RECORDER.

No. 474,791. Patented May 10, 1892.

Witness
J. N. Fowler Jr.
Arthur E. Fowell

Inventor
Chas. F. Brown
by
J. W. Alexander
Attorney (No Model.) 9 Sheets—Sheet 4.

C. F. BROWN.
CASH REGISTER, INDICATOR, AND RECORDER.

No. 474,791. Patented May 10, 1892.

Witness
J. M. Fawler Jr.
Arthur E. Sowell

Inventor
Chas. F. Brown
by
J. W. Alexander
Attorney (No Model.) C. F. BROWN. 9 Sheets—Sheet 5.
CASH REGISTER, INDICATOR, AND RECORDER.
No. 474,791. Patented May 10, 1892.
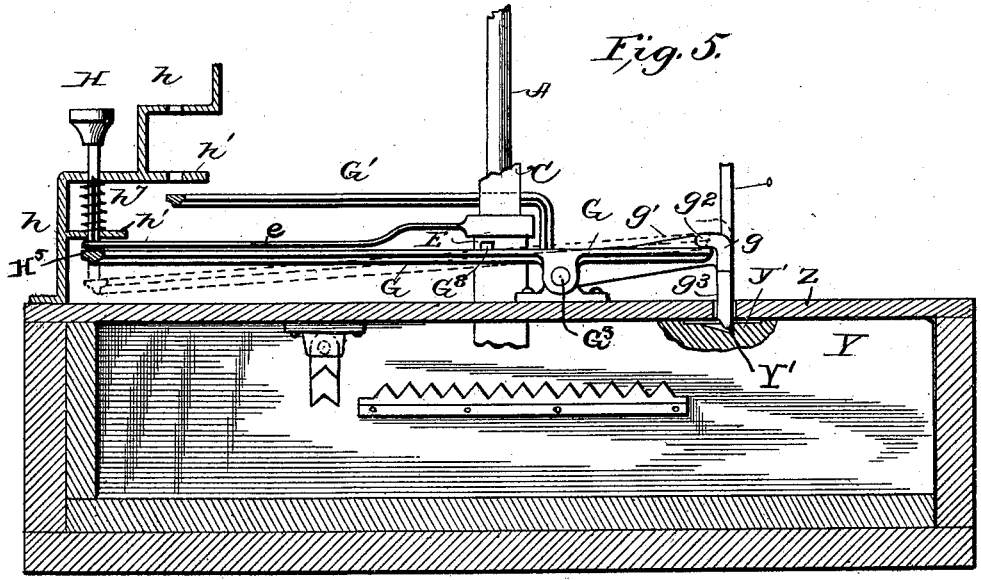
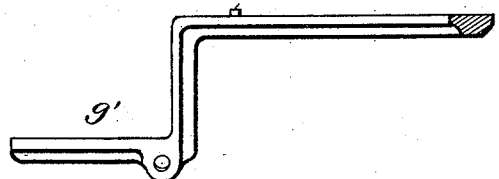
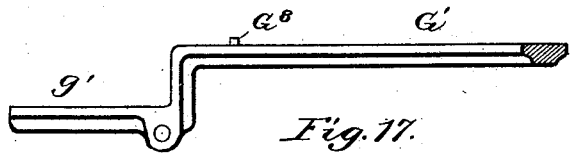
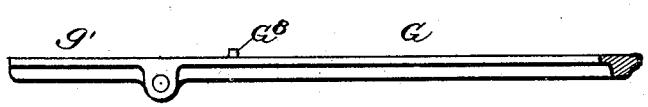

(No Model.)     9 Sheets—Sheet 6.
C. F. BROWN.
CASH REGISTER, INDICATOR, AND RECORDER.
No. 474,791. Patented May 10, 1892.
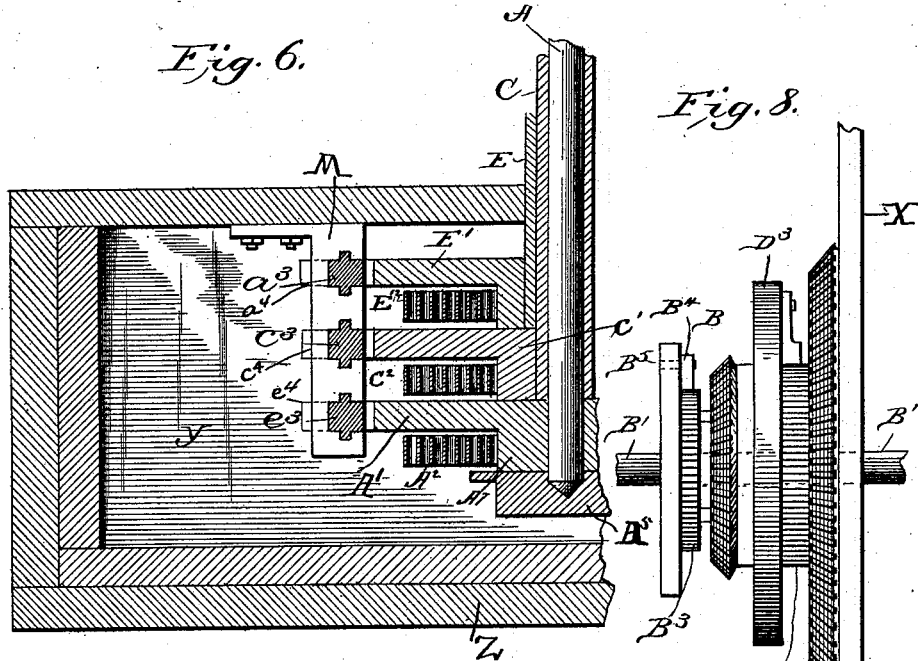
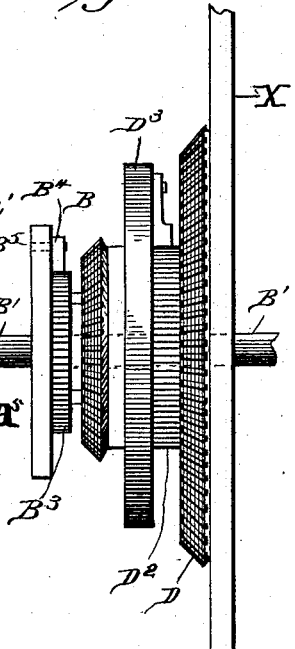
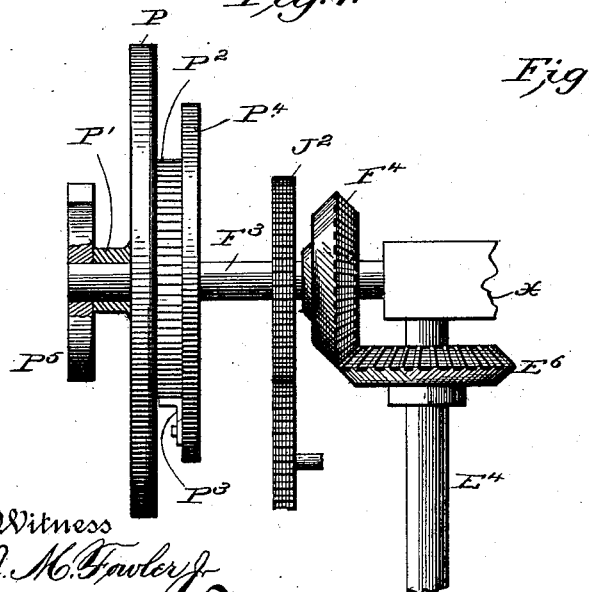
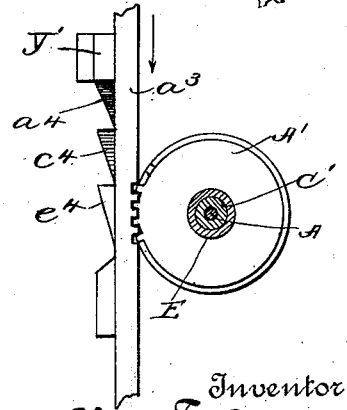
Witness
J. M. Fowler Jr
Arthur E. Dowell
Inventor
Chas. F. Brown
by J. M. Alexander
Attorney (No Model.) 9 Sheets—Sheet 7.
C. F. BROWN.
CASH REGISTER, INDICATOR, AND RECORDER.
No. 474,791. Patented May 10, 1892.
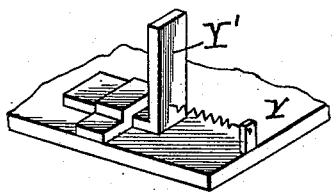
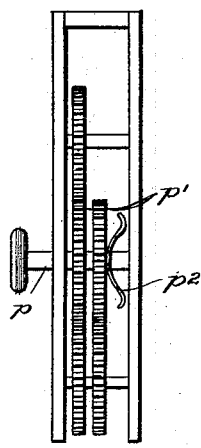
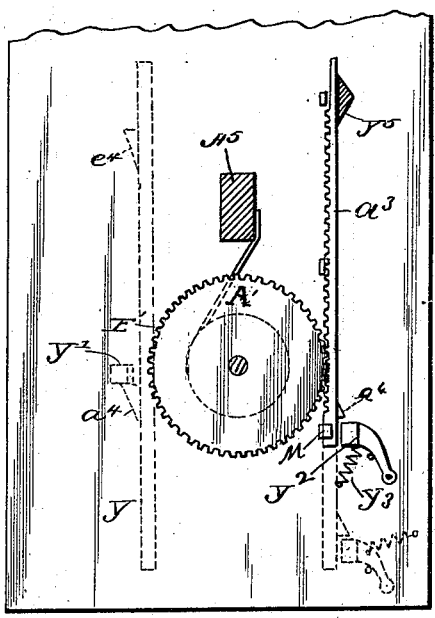
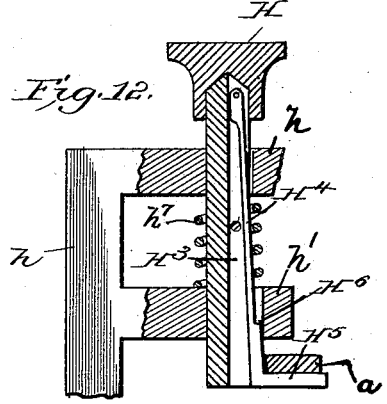
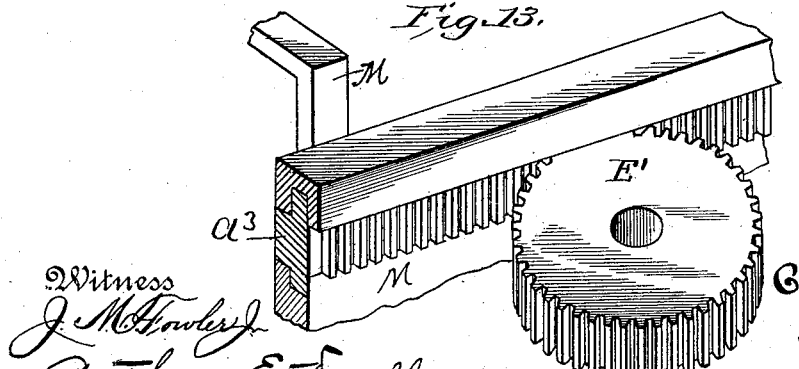
Witness
J. M. Fowler Jr.
Arthur E. Towell
Inventor
Chas F. Brown
by
J. H. Alexander
Attorney (No Model.) 9 Sheets—Sheet 8.
C. F. BROWN.
CASH REGISTER, INDICATOR, AND RECORDER.
No. 474,791. Patented May 10, 1892.
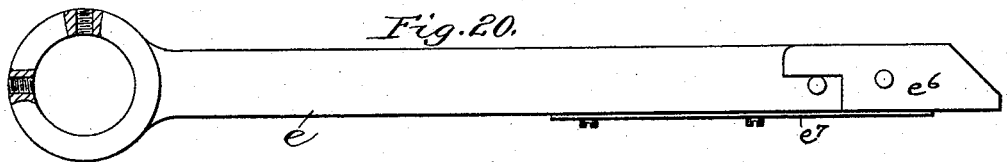
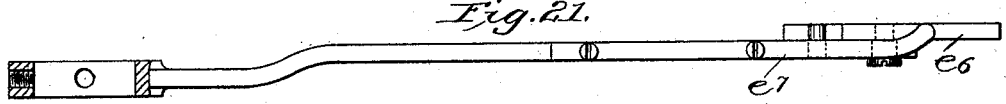
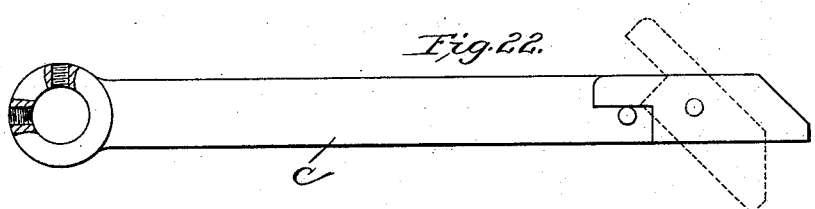
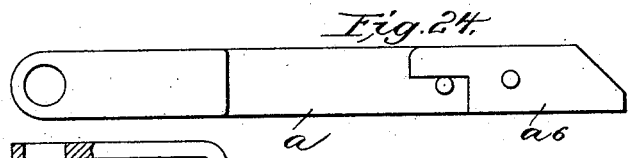
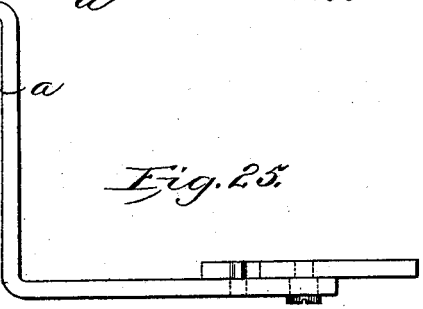
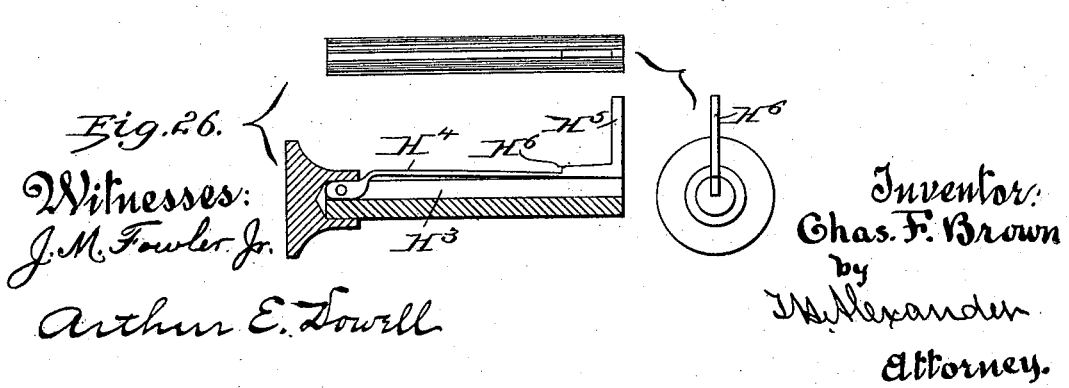
Witnesses:
J. M. Fowler Jr.
Arthur E. Lowell
Inventor:
Chas. F. Brown
by
J. K. Alexander
Attorney.

(No Model.) 9 Sheets—Sheet 9.
C. F. BROWN.
CASH REGISTER, INDICATOR, AND RECORDER.
No. 474,791. Patented May 10, 1892.
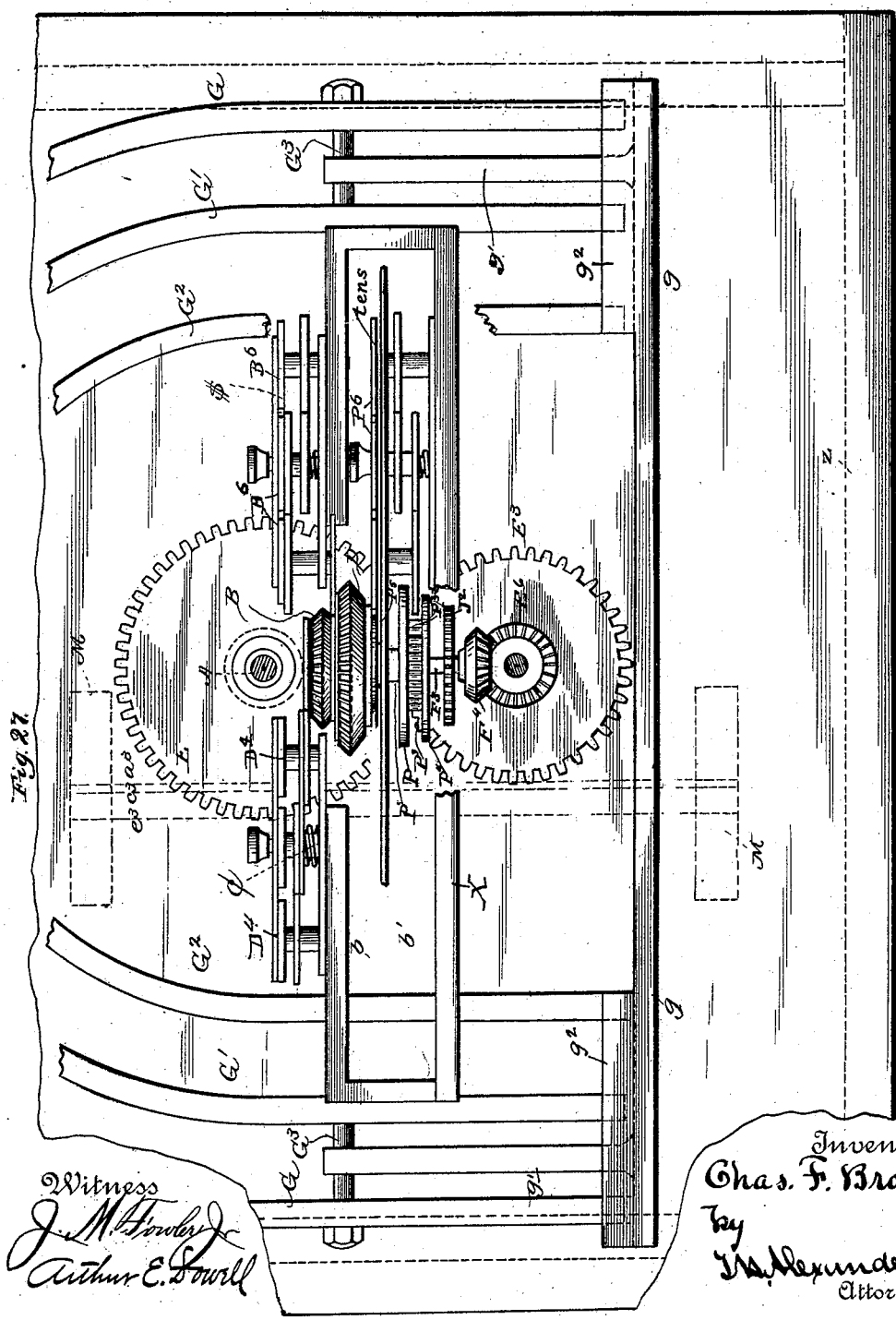
Witness
J. M. Fowler
Arthur E. Powell
Inventor
Chas. F. Brown
by
J. A. Alexander
Attorney

UNITED STATES PATENT OFFICE.

CHARLES F. BROWN, OF YONKERS, NEW YORK, ASSIGNOR TO THE ROYAL MACHINE COMPANY, OF SAME PLACE.

CASH REGISTER, INDICATOR, AND RECORDER.

SPECIFICATION forming part of Letters Patent No. 474,791, dated May 10, 1892.

Application filed September 19, 1891. Serial No. 406,205. (No model.)

*To all whom it may concern:*

Be it known that I, CHARLES F. BROWN, of Yonkers, in the county of Westchester and State of New York, have invented certain new and useful Improvements in Cash Registers and Indicators; and I do hereby declare that the following is a full, clear, and exact description thereof, reference being had to the accompanying drawings, and to the letters of reference marked thereon, which form part of this specification, in which—

Figure 1:
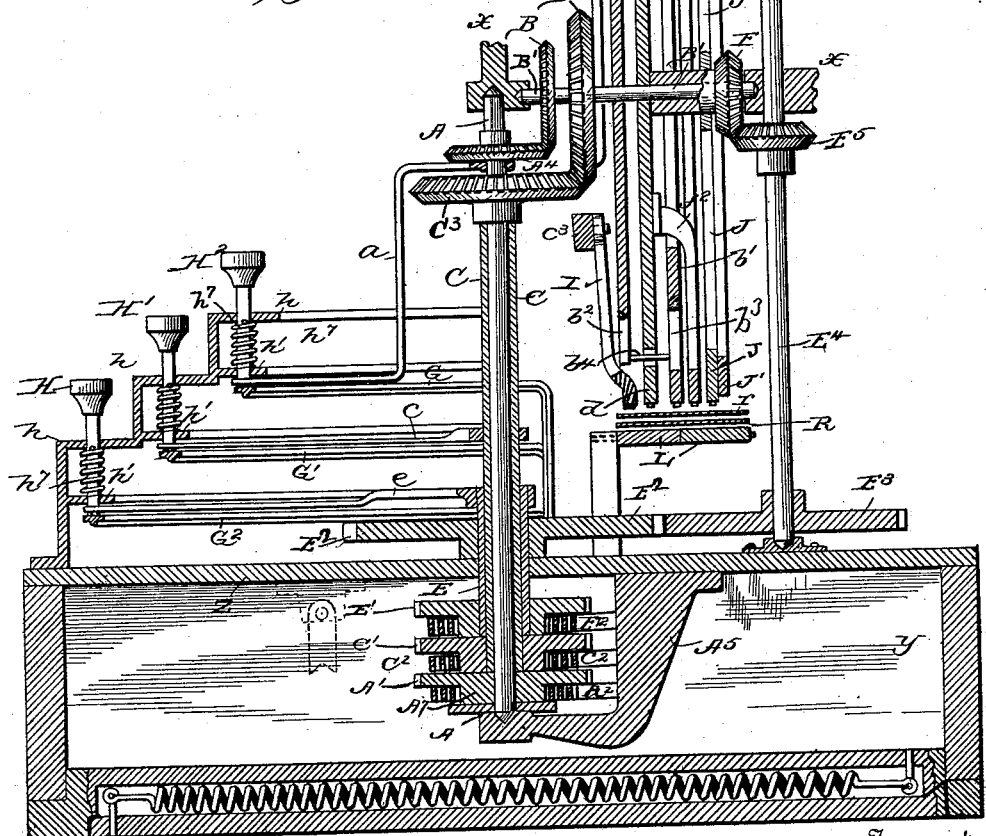
Figure 2:
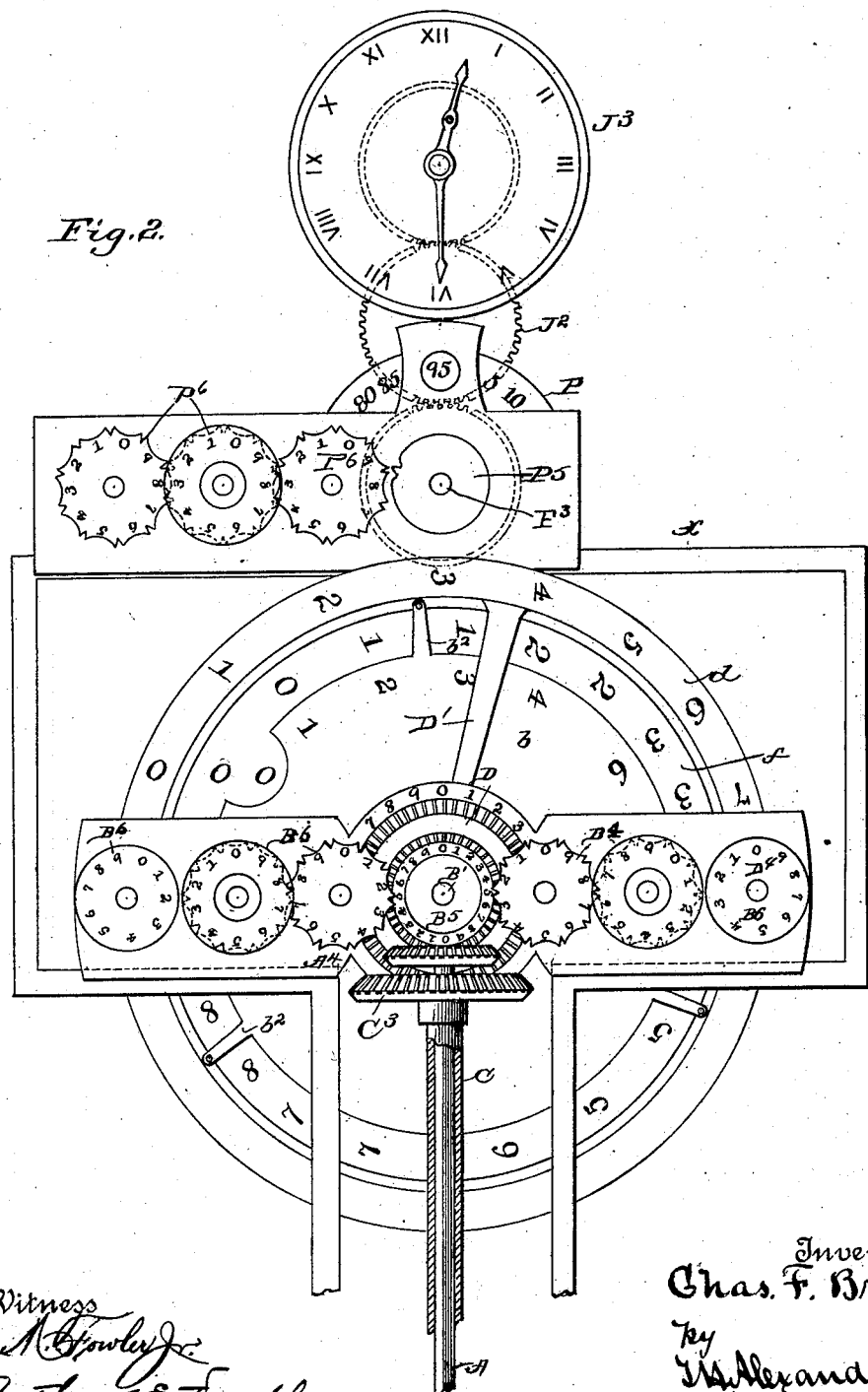
Figure 3:
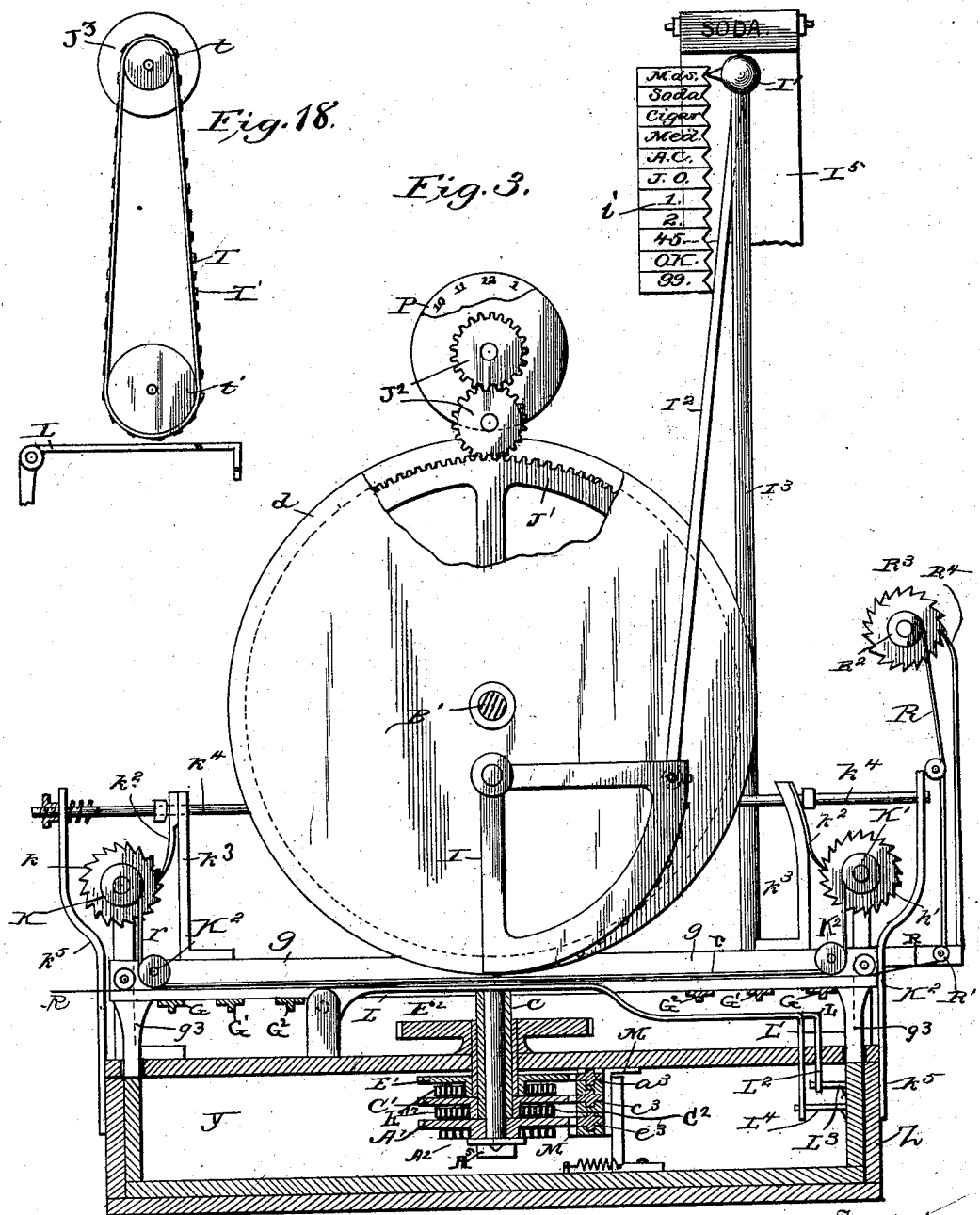
Figure 4:
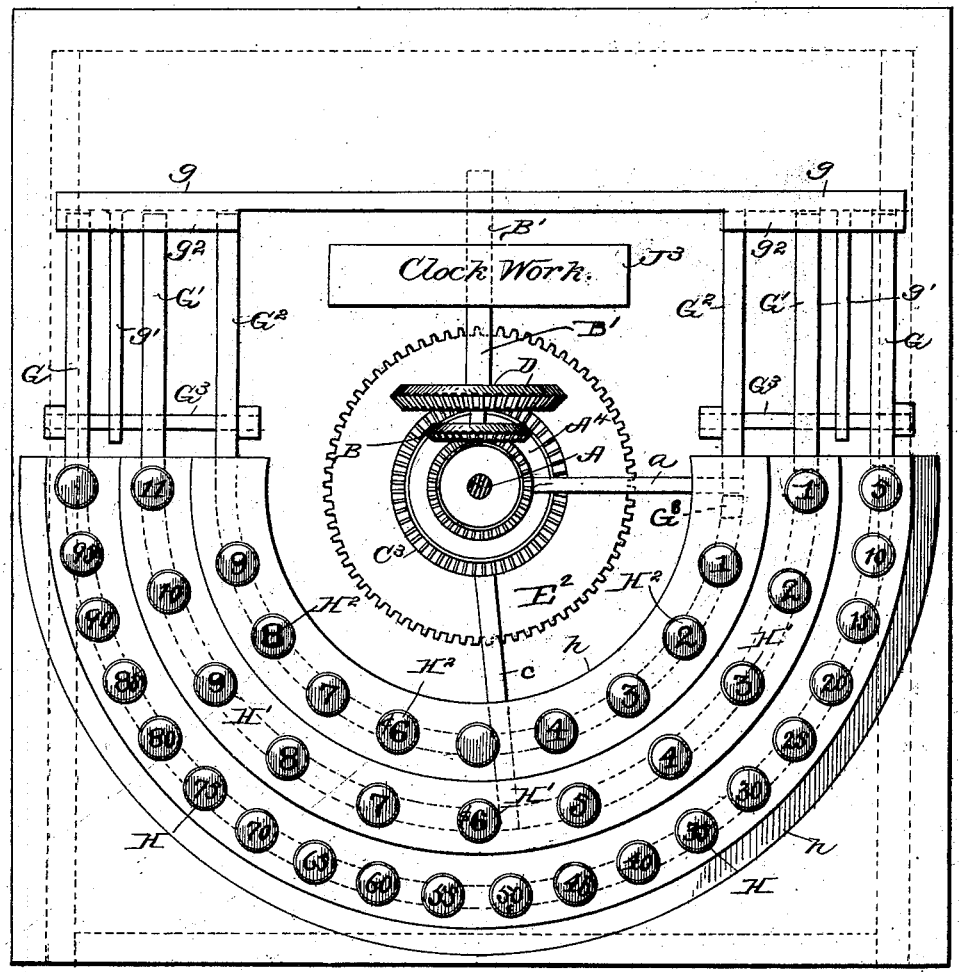

Figure 1 is a central vertical section of my improved cash register and indicator, the calculating devices being removed. Fig. 2 is a detail front elevation showing the indicating-dials and registering-wheels. Fig. 3 is a detail transverse vertical section showing the record-printing devices and a "goods-indicating" device. Fig. 4 is a detail plan view of the keyboard. Fig. 5 is a detail longitudinal vertical section showing the drawer-catch. Fig. 6 is an enlarged detail sectional view of the dial-controlling springs and racks. Fig. 7 is an enlarged detail view of the operating devices for the "tens-dial." Fig. 8 is an enlarged detail view of the operating devices for the registering-wheels of the "cents" and "dollar" dials. Fig. 9 is a detail plan view indicating by aid of the dotted lines the different arrangement of the racks controlling the dial-operating devices. Fig. 10 is a detail perspective of the rack-engaging lug. Fig. 11 is a detail view of a set of registering-wheels. Fig. 12 is a sectional view of one of the keys depressed. Fig. 13 is a detail perspective of one of the racks and gear for reversing the dial. Fig. 14, Sheet 6, is a detail top view of the gears and racks for reversing the dial or bringing them to zero position. Figs. 15, 16, and 17 are detail sectional views of the key-levers, Sheet 5, Fig. 18, Sheet 3, is a detail view of a modified arrangement of the time-recording devices. Fig. 19 is a detail edge view of the dials, tires, &c., showing the printing-types thereon, Sheet 1. Figs. 20 and 21, 22 and 23, and 24 and 25 are top and edge views of a dial-controlling arm. Fig. 26 illustrates the key-stem. Fig. 27 is an enlarged detail sectional plan view of the registering-dials and connections.

This invention is an improvement in cash registers and indicators, and especially upon the machine for which Letters Patent of the United States No. 458,143 were granted to me on the 18th day of August, 1891; and its objects are, first, to automatically print upon a record the amount of each sale; second, to record the time of each sale, together with the amount thereof; third, to enable the kind of goods sold at each sale or the person by whom the sale was made to be recorded and indicated; fourth, to cause any or all these records to be automatically effected during the opening and closing of the drawer; fifth, to simplify the dial-operating mechanisms so that the additions made by the registering mechanisms will be accurate and certain; sixth, to construct the machine so that it can be readily adapted to either display the amount of a sale until a succeeding sale is made and to be registered or to only display the amount of each sale during the recording thereof and while the drawer is open and return to zero position when the drawer is closed; seventh, to improve the construction of the keys, so that if any one be depressed it cannot rise until a register corresponding to its denomination in cents or dollars is made.

With these objects in view the invention consists in novel mechanisms for recording the amount of each sale and the time of making the sale; also, in novel mechanism for recording and indicating the kind of goods sold and the seller.

It further consists in novel means for operating the indicating-dials by springs, which are wound up by the closing or opening of the drawer, and in other novel details of construction and combination of parts, which will be hereinafter fully described, and briefly summarized in the claims.

Referring to the drawings by letters, Z designates the drawer-case upon which the recording and indicating mechanisms are mounted, and Y is the sliding drawer therein.

X is the framing for the movable parts of the machine on top of case Z.

A designates a vertical shaft passing through the top of case Z and supported at bottom on the arm of a bracket $A^5$, attached to the top of the case and at top in a bracket or projecting portion of frame X, as shown. On the lower end of shaft A is fixed a gear A′, having a hub A⁷, on which is wound a clock-spring A², one end of which is fixed to the hub and the other to the bracket A⁵, so that the spring is wound by revolving the shaft in one direction, and in unwinding will revolve the shaft in the opposite direction. On the upper end of shaft A is keyed a small bevel-gear A⁴, which meshes with a similar gear B, keyed on a short horizontal shaft B′, journaled in proper bearings in framing X and lying at right angles to shaft A.

$b$ designates an indicating-dial keyed on shaft B′ near its center, being the cents-dial, and hereinafter described.

C is a tubular shaft shorter than shaft A and slipped freely thereon, resting at bottom upon gear A′ and having a gear C′ fixed on its lower end, similar to gear A′, and operated by a coiled spring C².

C³ is a bevel-gear, larger than gear A⁴, fixed on the upper end of tube C and meshing with a bevel-gear D, loosely journaled on shaft B′ between gear B and disk $b$.

D′ is an arm or spoke attached to gear D and connected to an annular or ring-shaped dial $d$, much larger in diameter than dial $b$ and located slightly in rear thereof, the extremity of arm D′ being bent rearwardly, as indicated in Fig. 1. This dial $d$ is the dollar-dial, and is hereinafter described.

E designates a short sleeve slipped loosely on tube C and supported upon gear C′ and having a gear E′ and controlling-spring E¹² attached to its lower end, as shown, similarly to gear A′ and spring A². The gears A′ C′ E′ and their springs are below the top of the case and in the drawer-space, as shown. On the upper end of sleeve E, just above the top of the case, is keyed a large gear E², which meshes with a pinion E³ on a vertical shaft E⁴, parallel with, but in rear of, shaft A, and rising above the dial $d$ and journaled in proper bearings in framing X, shaft B′ lying intermediate and at right angles to shafts A and E⁴.

E⁵ is a small bevel-gear keyed on shaft E⁴ and meshing with a similar gear F, loosely journaled on shaft B′ in rear of dial $b$, and $f$ is an indicating-dial, larger than dial $b$, secured to the hub of gear F and lying within the dial $d$. Dial $f$ is the tens-dial, and is hereinafter more particularly described. The several dials are thus mounted face to face upon a single shaft, but are independently revoluble.

G G′ G² designate three curved levers bent into semicircular form and arranged one above the other and concentric to shaft A. Lever G′ is smaller than lever G and larger than lever G² and is arranged intermediate the two, so that the levers are "stepped." The levers are pivoted near their ends on bolts G³, secured to studs or projections of the framing on top of case Z at opposite sides of shaft A, the ends of levers G′ and G² being bent down, as indicated in Figs. 15, 16, and 17, so that they can all be pivoted on the same bolts, and the ends of the levers extend rearwardly in the same plane, as indicated in Figs. 1 and 3, and $g$ is a horizontal latch-bar lying at right angles to shaft A and the extremities of the levers, having forwardly-projecting arms $g'$ $g'$, which are pivoted on bolts G³, as shown in Fig. 27, so that the bar can have a vertical movement. The bar has lips $g^2 g^2$, which overlie the ends of levers G G′ G², so that if either of said levers be oscillated the bar $g$ will be lifted. Bar $g$ has latch-faced studs $g^3 g^3$ on its ends, depending through openings in the top of case Z and adapted to engage notches or keepers Y′ on the sides of drawer Y, as shown in Fig. 5, so that when either lever is oscillated the latch will be lifted and the drawer freed.

The levers G G′ G² are operated by means of keys H H′ H², arranged thereover in tiers, as shown and hereinafter described, and are upheld and kept in normal position by means of suitable springs arranged to lift their front portions when the keys rise.

$a$ designates an arm rigidly attached to shaft A near its upper end and bent outwardly and downwardly and again outwardly, so that its lower end overlies the upper lever G, across which it sweeps when shaft A is revolved.

$c$ designates an arm attached to tube C, its extremity overlying lever G′ and sweeping thereover when the tube is revolved, and $e$ is an arm attached to sleeve E or gear E³, projecting and sweeping over the lever G² when sleeve C is revolved.

When the parts are in normal position and the indicating-dials at zero, the several arms $a$, $c$, and $e$ are locked by engaging catch-lugs G⁸ on the respective levers G G′ G², as indicated in Figs. 4 and 15 and clearly described in my patent above referred to. When thus locked, the springs A², C², and E² are tensioned and are ready to revolve the shaft, tube, or sleeve as soon as the arm or arms is freed, and thereby revolve the relative dial or dials.

The levers and gearing are protected by a stepped semicircular conical top $h$, which also affords bearings for the rows of keys H H′ H², which are arranged in three tiers. Each key-stem passes through and is guided by openings in the top and in flanges $h'$, connected thereto, and is normally held raised by a coiled spring $h^7$ between the flanges $h'$ and top. Each stem (see Figs. 12 and 26) is formed with a longitudinal slot H³ in its side, in which is secured a spring-tongue H⁴, having its lower end bent outwardly at right angles, as at H⁵, and having a catch-shoulder H⁶ just above, which when the key is depressed will spring out and engage the under side of flange $h'$ and hold the key down until it is struck by one of the revoluble arms, when it will be forced inward, so as to permit the stem to partially rise until the end H⁵ catches under the arm, (see Figs. 5 and 12,) when the key is kept down until the arm moves back toward normal position. The end H⁵ thus serves to lock the key to the arm and to also limit the rise of the key by catching the under side of flange $h'$. The object of the catch-notch $H^6$ is to prevent the key rising until struck by the arm, and thus no matter how quickly a key may be depressed and released it is held down until struck by the arm and properly limits the movements of the latter, whereas if it could rise as soon as released, should the arm move slowly, the key might rise before the arm reached it, and the arm make a full sweep instead of being stopped by the key depressed, thereby causing errors in the amount indicated and registered.

The several dials and corresponding keys are figured and arranged to operate substantially as set forth in my patent aforementioned, and as indicated in accompanying drawings.

$b'$ designates an annular or ring-shaped dial corresponding in diameter to dial $b$ and arranged opposite the latter at the opposite side of dial $f$ and figured on its outer face like dial $b$. Dials $b$ $b'$ have radial spokes or arms $b^2$ $b^3$ projecting from their respective peripheries and united by means of rivets or studs $b^4$, which are exterior to the periphery of dial $f$ and move between the periphery of dial $f$ and inner edge of annular dial $d$, as shown, so that dial $b'$ is supported and operated by dial $b$. The arms $b^3$ of dial $b'$ extend farther outward and are connected to a tire $b^5$, corresponding in diameter to dial $d$.

$f'$ is a tire corresponding in diameter to tire $b^5$ and dial $d$ and connected to and supported by dial $f$ by means of spoke-arms $f^2$, attached to said dial, as indicated in Fig. 1. The periphery of dial $d$ is provided with types $d'$, (see Figs. 1 and 19,) corresponding in number and character to the numerals on the face of said dial and so located thereon that when a number on said dial appears at the sight-opening, the corresponding type-figures will be at the lowest point of the dial, or vertically beneath shaft B.

On the peripheries of tires $b^5$ and $f'$ are type characters $b^6$ and $f^3$, respectively, (see Figs. 1 and 19,) which correspond with the characters indicated on the faces of the dials $b$ and $f$, respectively, and are arranged so that when a character on said dials appears at the sight-opening the corresponding type will be at the lowest point of the tire. At this point an impression can be taken from the type upon a record-strip by mechanism hereinafter specified, so that the exact amount of each sale may be printed and recorded.

I designates a sector suspended from a stud attached to the framing X vertically below shaft B' and in front of the several dials. This sector is of such diameter that the lowest point of its periphery is in the same plane as the lowest point of the dial $d$ and tires $b^5$ $f'$ and in line therewith. This sector can be shifted on its axis by means of a sliding finger-piece I', connected to the sector by a link-rod I² and guided in its movements on a rod I³ or in other suitable manner. The finger-piece projects through the casing of the machine and beside a notched indicator-strip $i$, which is marked opposite each notch with figures or words indicating the kind of goods for sale or the numbers or names of salesmen employed. (See Fig. 3.) An indicating strip or card I⁵, marked like strip $i$, may be attached to the finger-piece I and drawn up and down therewith across a sight-opening in the machine, if desired, to show the purchaser the kind of goods recorded. The type-sector bears on its perimeter type corresponding to the marks on the strip $i$, so that when the finger-piece is shifted into engagement with either notch on scale $i$ the sector will be shifted so as to bring the corresponding type characters in position to make an impression upon the record-strip simultaneously with the recording of the amount of sale. It is necessary in using this sector for the salesman to shift the finger by hand before the key is depressed, so that the records will be simultaneously made and in line.

The time-record is made by printing from movable or shifting type time characters operated by clock mechanism mounted on the machine, the type being shifted so that at proper time type characters indicating the hour and minute will be brought into position to give an impression on the record-strip. This can be accomplished in various ways, and I have shown two devices that I deem simple and efficient, and which I will now describe. In Figs. 1 and 3 a disk J, corresponding in diameter to dial $d$, is loosely journaled on the hub of bevel-gear F in rear of dial $f$. This disk is calculated to revolve one or more times during every twenty-four hours, as may be determined, and its perimeter is divided, accordingly, into a corresponding number of divisions and bears time type characters arranged in regular order, which are successively and gradually brought into printing position in line with the type characters on the dials, tires, and segment. On the rear face of dial J is a gear J', which is driven by a train of gears J² from a clock mechanism J³, mounted on frame X above the dials, or in other convenient position, and so calculated as to properly revolve the disk during a predetermined interval of time. The time-disk is of course entirely independent of the indicating-dials in its operation, and the time of each sale can be exactly or approximately determined by noting the time-marks printed on the record nearest the sale-record. As shown in Fig. 18, instead of using disk J, I employ a belt T, running over a pulley $t$ on the hour-hand shaft of the clock or driven therefrom, so as to revolve synchronously therewith, and at bottom under a pulley $t'$, suitably journaled on frame X of the machine or other suitably-located support in such position that the lowest point of the belt will be in the same plane as the lowest point of dial $d$ and tires $b^5$ and $f$; or, in other words, the points of impression from the type on the tires, dial, and belt will lie in the same plane.

To the face of belt T are attached types T', indicating various divisions of time in regular succession, and as the belt revolves the types T' are successively brought into printing position. The belt T may be a sprocket-belt with type-blocks attached, and pulleys $t\ t'$ may be sprocket-wheels, if desired. The belt is useful when it is desired to display the amount of sales to both the customer and seller or in front and rear of the machine, as in my aforementioned patent.

The printing is effected as follows, (see figures:) K K' are horizontal ribbon-reels, like type-writer spools, located at opposite sides of the dials and provided with oppositely-facing ratchets $k\ k'$. The inking-ribbon $r$ runs from reel K down under an idler roller or guide $K^2$, thence across under the dials, tires, disk, or belt, to and under another guide $K^2$, and up to reel K'. R represents the record-strip of paper which is led from the roll or spool (not shown, but conveniently located at one side of the case) underneath the horizontal portion of ribbon $r$ and guides $K^2$, to and under a guide R', and then up to a spool $R^2$, supported in proper bearings on the framing, (not shown,) having a ratchet $R^3$ engaged by a spring-pawl $R^4$, mounted on the latch-bar $g$ and vibrated by the movements of the latter so as to impart a slight forward movement to the record-strip at each oscillation of the latch-bar. The reel-ratchets $k\ k'$ are engaged by dogs $k^2\ k^2$, attached to vertical spring-arms $k^3\ k^3$, rising from bar $g$, and $k^4$ is a shifting-rod passing through slots in said arms and through bracket-strips $k^5$ or other fixed supports on the case, so as not to hinder the vibrations of the arms. The rod is provided with collars and an adjusting nut or spring or other convenient means, so that it can be shifted longitudinally so as to disengage one dog $k^2$ from one reel-ratchet, and simultaneously cause the other dog to engage the opposite ratchet, thus enabling the ribbon to be wound alternately on the reels, as in type-writing machines. L L designate horizontal platen-strips lying beneath the dials and each pivoted at one end between ears attached to the top of the case and extending transversely of the case to near the opposite side thereof. The ribbon and record lie between the platens and dial-disks, &c., so that if the platen-strips be slightly elevated the ribbon and record-strip will be forced upward and an impression produced on the record-strip from the type on the sector, dial, tires, and belt or disk described. The free extremities of the platen-strips are provided with downwardly-depending fingers L' $L^2$, which depend through openings in the top of the case and are adapted to engage lugs $L^3\ L^4$ on the side of drawer Y, and the faces of the lugs or fingers are beveled so that when the drawer is moved in one direction the lugs will force the fingers and platen-strips upward and produce an impression. The platen-strips may be properly faced with any suitable material at the point where the impressions are to be made. One platen-strip will answer so as to take the impressions from all the type at once during either the forward or backward movement of the drawer; but in order to prevent tampering I prefer to use an independent platen for making the time-record, and so arrange the parts that the amount of sale and kind of goods may be taken while the drawer is closing, and the time of sale be taken upon the opening of the drawer, so that should the drawer be left open it could be detected by noting the variation between the records of time and sale. The drawer is an ordinary sliding drawer and is thrown open by suitable springs or other convenient means. It is cut away at back, however, to permit it to slide past the gears A' C' E' and the bracket $A^5$.

In using this class of machines it is desired by some parties to have a machine which will display the amount of each sale only at the time of making change or depositing the money in the drawer. Other parties desire a machine which will display the amount of each sale until a succeeding sale is made. My machine can be readily altered to suit either party by a slight transposition and alteration in the positions of the mechanism for positively operating gears A' C' E', and I will first describe such mechanism as adapted for working the machine to display the amount of sale only during the making of the change or while the drawer is open. $a^3\ c^3\ e^3$ are three independent sliding rack-bars suspended in hangers M M from the top of the case within the drawer-space. The rack-bars lie longitudinally of the drawer and respectively engage gears A' C E' and are longitudinally movable and have sufficient play in the hangers to enable them to permit or cause at least a half-revolution of the gears. These rack-bars are formed with a ratchet-tooth $a^4\ c^4\ e^4$, respectively, on their rear sides, which point forwardly and are adapted to be engaged by a stud Y', fixed to the bottom of the drawer, when the drawer is closing, and thus the rack-bars are pushed inward, and the gears A' E' C' rotated contrary to the springs, which are thereby tensioned and kept so as long as the drawer is closed, and as the gears are revolved backward the dials are turned back, also, until they reach zero position, when the arms $a$ $c\ e$ will engage the catch-lugs on levers G G' $G^2$, thus locking the dials at zero position, and the drawer is simultaneously locked by the latch-bar $g$, as before described.

The operation is now as follows: Upon a depression of a key in either one of the banks—say the 6-cent key $H^2$—it depresses lever $G^2$, and thereby simultaneously causes the release of arm $a$ and the lifting of latch $g$, leaving the drawer free to open, and as the drawer opens spring $A^2$ revolves gear A' which through its before-described connections rotates dial $b$ until the rotation of gear A' is stopped by arm $a$ striking the stem of the depressed key, as described when the figure "6" on the unit-dial will be visible at the sight-openings. The drawer continues to move open, and in doing so operates the platen-strip and "6" is marked on the record. The gear A' as it revolves throws the rack $a^3$ outward; but the other gears C' E' are locked by reason of the engagement of arm $c\ e$ with levers G' and G. When the drawer is pushed inward, stud Y' engages the tooth $a^4$ and forces rack $a^3$ back thereby returning gear A' to its first position, tensioning spring $A^2$, and bringing dial $b$ back to zero position and causing arm $a$ to again engage the catch on lever $G^2$. The time-record may be made as the drawer moves out or in, as before specified. The depression of any key in any bank will cause a similar operation of the parts. The action of the operative mechanism of all the indicating-dials is alike and will be clearly understood from the foregoing. Of course the rotation of the dial and gear is governed by the sweep of the arm, and the sweep of the arm is controlled by the location of the depressed key. After the drawer is opened by the depression of a key in either bank another key in another bank can be depressed and the corresponding dial shifted; but all must be brought back to zero position before a second key in the same row can be depressed with any effect on the indicating or registering mechanism. In order to prevent accidents, however, should one or more keys be depressed after the arm is in contact with a previous key, so as to be in the path of the arm, I construct the arms, as shown in Figs. 20 to 25, with pivoted end pieces $a^6\ c^6\ e^6$, which will yield as the arms swing backward, should they strike an obstruction, such as a depressed key-stem, but will not yield when the arms swing forward. Springs $e^7$ may be attached to the arm, so as to normally hold these end pieces in proper position to engage the key-stems as the arms swing forward.

I provide a registering mechanism for each dial, (see Figs. 2, 8, and 27,) so that there can be no cheating of the machine by the simultaneous depression of keys in different banks, as can sometimes be done where several indicators operate but one register. The cents dial-register is arranged, as shown on the right-hand side, in front of the dials and about in the same plane as shaft B'. Ratchet-wheel $B^3$ is fastened to bevel-gear B and is engaged by a dog $B^4$ on a single-toothed disk $B^5$, loosely journaled on the shaft B' in front of said gear, and this disk $B^5$ is so arranged that it can revolve in but one direction only as the ordinary register-wheels are formed. This disk $B^5$ is therefore revolved in but one direction by the rotary movement of dial $b$, and its face is divided into a decimal series of divisions suitably numbered. Disk $B^5$ operates the first of a train of registering-wheels $B^6\ B^6$, by which the total amounts of sales is calculated for dial $b$. A ratchet $D^2$ is fixed to bevel-gear D and engaged by a pawl on a toothed disk $D^3$, loosely mounted on shaft B'. Intermediate gears B and D and disk $D^3$ impart motion to the first of a train of registering-wheels $D^4\ D^4$ on the right-hand side of shaft B, as shown in Fig. 2, by which the total amounts of sales indicated by dial $d$ are calculated.

The total amount of sales indicated by dial $f$ are calculated by a register above the dials and at the left-hand side of the machine, as shown, which is operated as follows: A short horizontal shaft $F^3$ is journaled in the framing near the upper end of shaft $E^4$ and at right angles thereto, and is geared thereto by bevel-gears $E^6$ and $F^4$, similar to gears $E^5$ and F, respectively, so that shaft $F^3$ and the hub of gear F rotate synchronously. P, Fig. 7, is a disk which is fixed on a sleeve P', loosely journaled on the front end of shaft $F^3$, and $P^2$ is a ratchet fixed to the inner face thereof and engaged by pawls $P^3$, carried by a disk or arms $P^4$, fixed to shaft $F^3$ so as to revolve the disk in but one direction by the intermittent rotation of shaft $F^3$. This disk is numbered near its periphery like dial $f$. On the outer end of sleeve P' is fixed a single-toothed disk $P^5$, which is adapted to actuate the first one of a series of registering-wheels $P^6\ P^6$, by which the total amount of sales indicated by dial $f$ is calculated.

The particular construction of the registering-wheels is not important, as any of the well-known forms of such devices may be used. I have only desired herein to show how each dial is provided with and operates a separate total-registering device. The registering-dials, however, I prefer to construct as indicated in Fig. 11. In this the shaft $p$ of the intermediate registering-wheel $p'$ is longitudinally movable and can be shifted so as to throw $p'$ out of gear with the other wheels, thus freeing all of them and enabling them to be readily set to zero position, so that each day the registers may be set afresh and the total of each day's sale determined by simply noting the amounts indicated by the several registers. A spring $p^2$ on shaft $p$, however, normally keeps wheel $p'$ in engagement with the adjoining registering-wheels.

I will now describe the arrangement and operation of parts when the machine is to show the amount of the last sale from the time of recording same until a new sale is to be recorded. The main difference in this case lies in the arrangement of the rack-bars $a^3\ c^3\ e^3$. These are turned around and supported at the opposite or left-hand side of gears A' E' C', so that the rack-bars are drawn inward when the drawer opens. The teeth of the rack-bars also point in the opposite direction. (See Fig 9.) The stud Y' is replaced by a laterally-yielding finger $Y^2$ on the bottom of the drawer and held in a normal position by a spring $Y^3$. As the drawer moves outward this finger engages the teeth and drags the rack-bars forward, turning the gears backward and winding up the springs (which in this case are normally relaxed) and bringing the dials to zero position and the arms in position to engage levers G G' G², if all three dials have been previously operated. At the proper point the finger Y² engages a releasing-cam Y⁵, fixed to one of the brackets M or depending from the case, and is forced to move laterally out of engagement with the teeth of the rack-bars, and the springs A' C' E' immediately exert their power and revolve, throwing the rack-bars inward and shifting the dials until their movement is arrested by the engagement of the arms $a\ c\ e$ with a depressed key. Of course no dial will be affected unless one of its controlling-keys has been depressed. As the drawer moves inward the finger Y² yields in passing the teeth of the rack-bars and then springs forward in position to re-engage with them as the drawer opens. As the operation of all the dials is alike, I will explain the operation of one in this connection, and one, two, or all of the dials can operate simultaneously and independently. Supposing the drawer closed and the springs initially tensioned, "0" is shown on all the dials. Now depress the key "6" in row H². It oscillates lever G², releasing the arm and drawer, as before described, and the dial $b$ rotates until the arm $a$ is arrested by striking the stem of the depressed key, and "6" appears at the sight-opening, and the record may be printed, as before described. When the arms strike the keys, the latter are locked by the engagement of the key-finger H⁵ under the arm, yet rise sufficiently to permit lever G² to assume a normal position and lock the drawer when pushed inward. As stated, when the drawer moves inward finger Y² simply yields and rides over the ratchet-teeth of the racks, and hence dial $b$ remains out of normal position with "6" displayed at the sight-opening and arm $a$ bearing against the key-stem. Now suppose an eight-cent sale is made. Key "8," H², is depressed, operating lever G² and releasing the drawer, which is either pulled open or forced open by proper springs, and as it opens finger Y² engages lug $a^4$ of rack $a^3$ and drags the rack $a^3$ forward, thereby causing it to turn gear A' backward, tensioning spring A², and simultaneously throwing dial $b$ back to zero position; but as soon as finger Y² is disengaged from tooth $a^4$ by cam Y⁵, while the drawer is moving outward, spring A² exerts its strength and throws rack $a^3$ inward, turns shaft A and through it dial $b$ forward until arm $a$ strikes the stem of key H², "8," last depressed. Key "8," H², raised as arm $a$ was moved backward in the initial opening of the drawer. Hence it is out of the way. When the drawer is closed, dial $b$ still remains as shifted, displaying "8" at the sight-opening, and key "8," H², is held partially depressed by reason of the engagement of arm $a$ therewith. In short, it will be observed that in one case the dials are brought back to zero position upon the closing of the drawer and held in such position until another key is depressed, when they shift to show the amount corresponding with the key while the drawer is open. In the other case the dials are brought back to zero position, are instantly released, and shift to show the number of the key depressed during the opening of the drawer and remain shifted while and after the drawer is closed and until it is again in the act of opening. Every dial is brought back to zero position during the outward movement of the drawer, and all the dials, except that one, or more, whose corresponding key has been depressed to operate the lever and release the drawer, will be held at zero position by the engagement of arm $a$, $c$, or $e$ with the catch on the curved lever G G' G². The spokes on dials $b$, $b'$, and $f$ are so located that they will not obscure the figures shown at the sight-openings of the machine, and the dials $b$, $b'$, and $f$ may be made like spoked wheels instead of solid disks.

A change-key may be added, if desired, and arranged to lift latch-bar $g$ without depressing either lever G, G', or G², so that none of the disks will be disturbed or shifted. I have not shown such key, as I do not claim it. I also propose to use some device—such as shown in my aforesaid patent, for instance—to prevent the drawer being partially opened and then closed or partially closed and then opened.

Having described my invention, what I claim as new, and desire to secure by Letters Patent thereon, is—

1. In a cash-register, the combination of an indicating-dial having type characters on its perimeter and a dial beside the indicating-dial, having a series of time-indicating type characters on its periphery operated by clockwork, a sliding drawer, and mechanism controlled by the movement of the drawer adapted to take an impression from one of the type on each dial at each opening and closing of the drawer, substantially as and for the purposes set forth.

2. In a cash-register, the combination of a revoluble dial having type attached to its periphery and a sliding drawer below the same with a movable platen lying between the drawer and edge of dial and having depending fingers adapted to engage lugs on the drawer and be operated thereby during the movement of the drawer, substantially as described.

3. In a cash-register, the combination of a pair of independently-revoluble dials mounted on a common shaft, having type characters attached to their peripheries, and means for independently operating said dials, a platen lying below said dials, a record-strip, and means for feeding said strip between the dials and platen, a sliding drawer below the platen, and beveled lugs and fingers respectively connected to the platen and drawer for operating said platen to produce an impression on the strip from the type on the dials when the drawer is moved, substantially as set forth.

4. The combination of a revoluble dial having type time characters attached to its periphery, a sliding drawer, a platen underlying said dial, and the beveled finger and lug for moving said platen toward the adjoining type on the dial when the drawer moves in one direction with means for feeding a record-strip between the dial and platen, substantially as described.

5. In a cash-register, the combination of an indicating-dial and a time-dial having type characters attached to their peripheries, and a sliding drawer, and a platen having a finger depending into the drawer, and a lug on the drawer engaging said finger, whereby the platen is operated by the movement of said drawer to take an impression from the proper type on the said dials, substantially as and for the purpose described.

6. The combination, in a cash-register, of a revoluble dial having type characters on its face, clock-work for revolving said dial, a sliding drawer, a latch therefor, a platen underlying said dial and operated by the movement of said drawer, a record-strip, and an inking-ribbon, and means operated by the movement of the latch for feeding the record-strip between the dial and platen at each opening or closing of the drawer, substantially as described.

7. In a cash-register, the combination of a revoluble indicating-dial with a tire connected to said dial by spokes and revoluble therewith, having on its periphery type characters corresponding to those on the dial, substantially as set forth.

8. In a cash-register, the combination of a revoluble indicating-dial with a tire connected to said dial by spokes and revoluble therewith, having on its periphery type characters corresponding to those on the dial, and mechanism for taking an impression from the type on said tire upon a record strip at each opening or closing of the drawer, substantially as described.

9. In a cash-register, the combination of a dial having type characters on its periphery, a second indicating-dial, a tire attached to the second dial by spoke-arms and having type characters on its periphery corresponding to the indicating characters on the second dial, means for independently revolving said dials, and means for printing on a record from the type on said dial and tire, substantially as described.

10. The combination of an indicating-dial having type characters on its periphery corresponding to the indicating characters on its face, a smaller dial having indicating characters on its face, and a tire corresponding in diameter to the first dial connected to the second dial and having type characters on its perimeter corresponding to the characters on the small dial, both said dials being mounted on a common shaft, with a sliding drawer, a platen operated from said drawer, and inking-ribbon and record-strip feeding devices, substantially as and for the purpose specified.

11. The combination of a large indicating-dial having type characters on its periphery, a small indicating-dial, a tire attached thereto having type characters on its periphery, and a time-dial having type characters on it periphery, a record-strip, and means, substantially as described, for independently operating said dials and for taking a record from the type characters thereof upon the strip, substantially as described.

12. In a cash-register, the combination of a revoluble dial mounted on a horizontal shaft and having type characters on its periphery, a horizontally-sliding drawer below the dial, a pivoted platen strip lying between said dial and drawer and having a depending beveled finger on its end adapted to engage a lug on the side of the drawer and be raised thereby as the drawer slides, and means for feeding a record-strip and ink-ribbon between the disk and platen, substantially as described.

13. The combination, in a cash-register, of a sliding drawer, a record-strip-feeding device, and pivoted sector having type characters on its periphery, a rod directly connecting this segment to a movable finger-piece projecting through the casing of the machine and adapted to be shifted by hand, and means for taking an impression from the type on the sector after it is shifted upon a record-strip during the opening or closing of the drawer, substantially as set forth.

14. The combination, in a cash-register, of a dial having type on its periphery and a sector pivoted beside the dial having type characters on its periphery and means for automatically revolving said dial and the pull-rod and finger-piece for shifting said sector with a sliding drawer, a record-strip-feeding mechanism, and means for taking an impression from the type on said dial and sector upon a record-strip during the opening or closing of the drawer, substantially as and for the purpose specified.

15. The combination, with a rotatable dial-plate, a vertical shaft, means for rotating the same, gearing between said shaft and dial, and an arm attached to said shaft, of a sliding drawer, a latch-bar for locking the same, a pivoted lever underlying said arm and adapted to engage said arm and hold the parts normally locked and to lift the latch-bar and release the drawer when depressed, and a key-stem adapted to depress said lever, substantially as described.

16. In a cash-register, the combination of the drawer, a latch-bar for locking the same, and a series of rows of key-stems with curved pivoted levers, each underlying a row of said key-stems and having their ends so arranged that they will independently lift the latch-bar when a key in the corresponding row is depressed, substantially as specified.

17. The combination of the rotatable dial, the rotatable shaft geared thereto, having a radially-projecting arm, the pivoted key-lever underlying said arm and adapted to normally lock the same, and the key-stems for operating said lever with the drawer and the latch-bar operated by said lever, the gear on the lower end of said shaft, and the rack-bar engaging said gear operated by the drawer, substantially as described.

18. The combination of the rotatable dial-plate having type characters secured to its periphery, a revoluble shaft and gearing for operating said dial, and an arm on said shaft with a pivoted lever underlying said arm adapted to engage said arm and hold the parts normally locked, and mechanism, substantially as described, for taking an impression from the type on the dial upon a record-strip, substantially as set forth.

19. In a cash-register, the combination of a rotatable dial, a shaft and gearing for operating the same, a gear on the lower end of said shaft, a sliding rack engaging the gear and adapted to turn the shaft in one direction when shifted, a movable drawer, and a stud therein adapted to engage and move said rack, and a spring for turning the shaft in the opposite direction when the rack is released, substantially as set forth.

20. In a cash-register, the combination of the indicating devices and the shaft for operating the same, the gear on the lower end of said shaft, and a sliding rack engaging said gear with a sliding drawer and a pivoted or yielding stud therein adapted to engage said rack and move it as the drawer moves in one direction, substantially as specified.

21. In a cash-register, the combination, with the indicating devices and a shaft for operating the same, having a gear on its lower end within the drawer-space, and a sliding rack engaging said gear, of the sliding drawer, the stud adapted to engage said rack and move it in one direction during either the opening or closing of the drawer, and the spring for revolving the shaft and gear in the opposite direction when the stud disengages the rack, substantially as specified.

22. In a cash-register, the combination of a rotatable dial-plate, a vertical shaft geared thereto, a second vertical shaft or sleeve depending into the drawer-space, having a gear on its upper end meshing with a pinion on the first shaft, and mechanism for independently and positively rotating the shaft and sleeve during either the opening or closing of the drawer, and springs for rotating the shaft and sleeve in the opposite direction during the reverse movement of the drawer, substantially as described.

23. In a cash-registering machine, the combination of a rotatable dial-plate, a vertical shaft geared thereto, a second vertical shaft or sleeve depending into the drawer-space, having a gear on its upper end meshing with a pinion on the first shaft, and mechanism for positively rotating the sleeve during either the opening or closing of the drawer, and springs for rotating the sleeve in the opposite direction during the reverse movement of the drawer, and a registering mechanism operated by gearing from the first-mentioned shaft to calculate the total sales indicated by said dial, substantially as set forth.

24. The combination, with a rotatable dial-plate, a revoluble shaft having a radially-projecting arm provided with a pivoted end piece, and gearing between said shaft and dial, of a pivoted lever underlying the end piece of said arm adapted to engage the same and hold the parts normally locked, and a series of key-stems adapted to depress said lever, substantially as described.

25. The combination, in a cash-register, of a rotatable vertical shaft, tube, or sleeve, substantially as described, an indicating-dial geared thereto, and a series of key-stems with a horizontal arm attached to said shaft, tube, or sleeve and projecting radially therefrom and having a pivoted spring-controlled piece attached to its end adapted to contact with the ends of the key-stems, substantially as described.

26. The combination, in a cash-register, of the indicating devices, the shaft for operating the same, having a radially-projecting arm, with a series of key-stems adapted to engage and stop the movement of said arms when depressed, and each having a tongue on its lower end adapted to catch beneath the arm and hold the key down until the arm is moved backward, substantially as described.

27. In a cash-register, the combination, with a sweeping arm and a pivoted lever adapted to normally lock said arm, of a series of slotted key-stems, each having a spring-catch secured in its slot adapted to engage the edge of the guide-opening through which the stem passes and hold the key down when depressed until it is struck by the sweeping arm and forced back into the slot, substantially as specified.

28. In a cash-register, the combination of an indicating-dial and a revoluble shaft geared thereto, having a radially-projecting arm and a pivoted key-lever underlying said arm and adapted to normally lock the same, with the key-stem adapted to depress said lever and release the arm but limit the movement thereof, and the shouldered spring-catch attached to said stem, and a projecting piece adapted to catch beneath the arm and hold the key down until the arm is moved back, all substantially as specified.

29. In a cash-register, the combination, with the longitudinally-slotted key-stem, of the spring-catch secured in the slot, having shoulder $H^6$ and projecting angular end $H^5$, all as and for the purpose specified.

30. In a cash-register, the combination of the indicating-dial, having type attached to its periphery, the revoluble shaft geared thereto, having a radially-projecting arm, and means for rotating said shaft, a pivoted key-lever underlying said arm and adapted to normally lock the same, and the key-stem adapted to depress said lever with a sliding drawer, a latch-bar for the same operated by said lever, a platen underlying said dial and operated by mechanism actuated from said drawer, and a record-strip and an inking-ribbon feed mechanism operated by said latch-bar, substantially as described.

31. In a cash-register, the combination of the sliding drawer, the latch-bar therefor, a key-lever, and stem for operating said latch-bar with the type-bearing devices, the ink-ribbon reels operated by spring-fingers attached to said latch-bar, and a record-strip reel operated by a finger attached to the latch-bar, and a platen, substantially as herein specified.

32. In a cash-register, the combination of a drawer and its vertically-movable latch-bar with ribbon-spools mounted above the bar, ratchets attached to said spools, the dogs mounted on spring-arms attached to said latch-bar, and a rod and connections for shifting the dogs, all constructed and arranged to operate substantially as described.

33. In a cash-register, the combination of a pair of independently-revoluble dials mounted on the same shaft, the shaft and tube geared to said dials, respectively, for independently revolving the same, and the spring-controlled gears mounted on the lower end of said shaft and tube, respectively, the independent sliding racks engaging said gears, and the sliding drawer and the stud therein adapted to engage and move said racks in one direction, substantially as specified.

34. In a cash-register, the combination of a pair of independently-revoluble dials mounted on the same shaft, the shaft and tube geared thereto for independently revolving the same, and the spring-controlled gears mounted on the lower end of said shaft and tube, respectively, the independent sliding racks engaging said gears, and the sliding drawer and stud therein adapted to engage and move said racks in one direction, the radial arms attached to said shaft and tube, the key-levers underlying and locking said arms, and the key-stems adapted to depress said levers, release the arms, and limit the movement thereof, substantially as described.

35. In a cash-register, the combination of a pair of independently-revoluble dials mounted on the same shaft, the shaft and tube and gearing for independently revolving said dials, and the spring-controlled gears mounted on the lower ends of said shaft and tube, respectively, the independent sliding racks engaging said gears, means for moving said racks to wind the springs, and the independent registering devices respectively operated from said dials, all substantially as specified.

36. In a cash-register, the combination of the pair of independently-revoluble dials mounted on the same shaft, the shaft and tube geared to said dials for independently revolving the same, and the spring-controlled gears mounted on the lower ends of said shaft and tube, respectively, the independent sliding racks engaging said gears, and the sliding drawer and stud therein adapted to engage and move said racks in one direction, the radial arms attached to said shaft and tube, key-levers underlying and locking said arms, key-stems adapted to depress said levers, the locking device for the drawer operated by said levers, and independent registering devices respectively operated from said dials, substantially as described.

37. In a cash-register, the combination of the dial $b$, keyed to shaft $B'$, the larger dial $f$, loosely mounted on said shaft, the annular dial $b'$, lying opposite dial $b$ and connected thereto by spoke-arms, substantially as described, and mechanism for independently revolving dials $b$ and $f$, substantially as set forth.

38. In a cash-register, the combination of the shaft $B'$, dial $b$, fixed thereon, larger dial $f$, loosely mounted thereon in rear of dial $b$, the gear D, loosely mounted thereon in front of dial $b$, and a large annular dial $d$, connected to gear D by spoke-arms, substantially as described.

39. In a cash-register, the combination of the shaft $B'$, dial $b$, fixed thereon, larger dial $f$, loosely mounted thereon in rear of dial $b$, the gear D, loosely mounted thereon in front of dial $b$, and a large annular dial $d$, connected to gear D by spoke-arms, and the tires $b^5$ and $f'$, respectively connected with dials $b$ and $f$, all substantially as and for the purpose specified.

40. In a cash-register, the combination, with the indicating-dials and the type attached to their peripheries, and pivoted platen-strips underlying said dials and having fingers on their ends depending into the drawer-space, of the sliding drawer having lugs on its side adapted to engage said fingers and operate said platens, substantially as described.

41. The combination of the indicating-dial, the shaft and gearing for operating the same, the gear on said shaft, and the sliding rack engaging said gear with a sliding drawer, the stud connected thereto adapted to engage said rack during the movement of the drawer in one direction, and the cam arranged to disengage said stud from the rack, substantially as specified.

42. The combination of the revoluble dial-plate, a vertical shaft geared thereto, and mechanism for operating said shaft to shift the dial with a horizontal shaft lying above said dial and driven by gearing from said vertical shaft, a sleeve on the front end of said shaft, a ratchet on the inner end of said sleeve engaged by dogs on said horizontal shaft, the indicating-disk fixed to said ratchet, and the train of registering-wheels operated from said sleeve, substantially as and for the purpose described.

In testimony that I claim the foregoing as my own I affix my signature in presence of two witnesses.

CHARLES F. BROWN.

Witnesses:
HENRY WALDECK,
WILLIAM FULLER.